(12) United States Patent
Chen et al.

(10) Patent No.: US 10,902,976 B2
(45) Date of Patent: Jan. 26, 2021

(54) OPTICAL FIBER BASED SENSING FOR SMART ELECTRICAL CABLES AND DISTRIBUTED RADIATION DETECTION

(71) Applicant: UNIVERSITY OF PITTSBURGH-OF THE COMMONWEALTH SYSTEM OF HIGHER EDUCATION, Pittsburgh, PA (US)

(72) Inventors: Peng Kevin Chen, Pittsburgh, PA (US); Mohamed A. Bayoumy, Pittsburgh, PA (US); Aidong Yan, Pittsburgh, PA (US); Rongzhang Chen, Missouri City, TX (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 115 days.

(21) Appl. No.: 16/084,300

(22) PCT Filed: Mar. 20, 2017

(86) PCT No.: PCT/US2017/023147
§ 371 (c)(1),
(2) Date: Sep. 12, 2018

(87) PCT Pub. No.: WO2017/165265
PCT Pub. Date: Sep. 28, 2017

(65) Prior Publication Data
US 2019/0080822 A1    Mar. 14, 2019

Related U.S. Application Data

(60) Provisional application No. 62/312,059, filed on Mar. 23, 2016.

(51) Int. Cl.
*H01B 7/18* (2006.01)
*H01B 7/17* (2006.01)
(Continued)

(52) U.S. Cl.
CPC ............... *H01B 7/18* (2013.01); *G01K 11/32* (2013.01); *H01B 7/17* (2013.01); *H01B 7/32* (2013.01); *H01B 9/00* (2013.01); *H01B 9/02* (2013.01)

(58) Field of Classification Search
CPC ...................................... G01K 11/32
See application file for complete search history.

(56) References Cited

U.S. PATENT DOCUMENTS

| 8,503,599 B2* | 8/2013 | Koste ..................... G01K 11/30 376/244 |
| 8,953,915 B2* | 2/2015 | Sarchi .................... G01K 11/32 385/101 |

(Continued)

FOREIGN PATENT DOCUMENTS

| CN | 204945215 U | 1/2016 |
| JP | 05-296856 A | 11/1993 |

*Primary Examiner* — John Bedtelyon
(74) *Attorney, Agent, or Firm* — Philip E. Levy; Eckert Seamans Cherin & Mellott LLC

(57) ABSTRACT

A cable device includes a sheath member, a number of electrical cables provided within the sheath member, and an optical fiber sensing member provided within the sheath member. The optical fiber sensing member includes a functionalized optical fiber based sensor device structured to exhibit a change in one or more optical properties in response to changes in a parameter of interest. Also, a method of sensing radiation includes introducing a source light into an optical fiber sensing member provided within a structure, wherein the optical fiber sensing member comprises a functionalized optical fiber based sensor device structured to exhibit a change in one or more optical properties in response to radiation, detecting sensing light generated in response to the source light, and determining a (Continued)

radiation level at a plurality of locations within the structure using the detected sensing light and a distributed sensing scheme.

25 Claims, 3 Drawing Sheets

(51) Int. Cl.
*H01B 9/00* (2006.01)
*G01K 11/32* (2006.01)
*H01B 7/32* (2006.01)
*H01B 9/02* (2006.01)

(56) References Cited

U.S. PATENT DOCUMENTS

| | | |
|---|---|---|
| 2002/0085819 A1 | 7/2002 | Stottlemyer et al. |
| 2012/0082422 A1 | 4/2012 | Sarchi et al. |
| 2014/0321798 A1 | 10/2014 | Chen et al. |

* cited by examiner

OPTICAL FIBER BASED SENSING FOR SMART ELECTRICAL CABLES AND DISTRIBUTED RADIATION DETECTION

CROSS-REFERENCE TO RELATED APPLICATIONS

This application is a U.S. National Stage Application under 35 U.S.C. § 371 of International Application No. PCT/US2017/023147, filed on Mar. 20, 2017, entitled "Optical Fiber Based Sensing for Smart Electrical Cables and Distributed Radiation Detection," which claims priority under 35 U.S.C. § 119(e) from U.S. provisional patent application No. 62/312,059, entitled "Smart Electrical Cable Enabled by Optical Fibers" and filed on Mar. 23, 2016, the contents of which are incorporated herein by reference.

GOVERNMENT CONTRACT

This invention was made with government support under grant #DE-NE0008303 awarded by the Department of Energy (DOE). The government has certain rights in the invention.

BACKGROUND OF THE INVENTION

1. Field of the Invention

The disclosed concept pertains to optical fiber based sensors used in industrial, commercial or residential structures, such as, without limitation, a nuclear reactor, and in particular, to a smart electrical cable that is structured to sense one or more parameters using optical fiber sensing technology and to a system and method for distributed radiation sensing.

2. Description of the Related Art

The safe and efficient operation of industrial facilities, such as nuclear reactors and various fuel cycle processes, can be significantly enhanced through information gathered by ubiquitous sensor technology. The deployment of advanced sensors is important to safe-guard such facilities, like nuclear energy systems, at both component and system levels. For sensor networks used in nuclear energy systems, they must withstand harsh environments and perform proper measurements during both normal operation and in harsh post-accident situations for long periods of times. At the same time, the deployment of the sensor network should not significantly increase engineering complexities and cost for new and existing nuclear power systems, which are already very expensive.

SUMMARY OF THE INVENTION

In one embodiment, a cable device is provided that includes a sheath member, a number of electrical cables provided within the sheath member, and an optical fiber sensing member provided within the sheath member. The optical fiber sensing member includes a functionalized optical fiber based sensor device structured to exhibit a change in one or more optical properties in response to changes in a parameter of interest.

Other embodiments include a system and a method that employ a cable device as just described.

In still another embodiment, a method of sensing radiation within a structure is provided that includes introducing a source light into an optical fiber sensing member provided within the structure, wherein the optical fiber sensing member comprises a functionalized optical fiber based sensor device structured to exhibit a change in one or more optical properties in response to radiation, detecting sensing light generated in response to the source light, and determining a radiation level at a plurality of locations within the structure and along the optical fiber sensing member using the detected sensing light and a distributed sensing scheme. A system that employs this method is also provided.

DETAILED DESCRIPTION OF EXEMPLARY EMBODIMENTS

Figure 1:
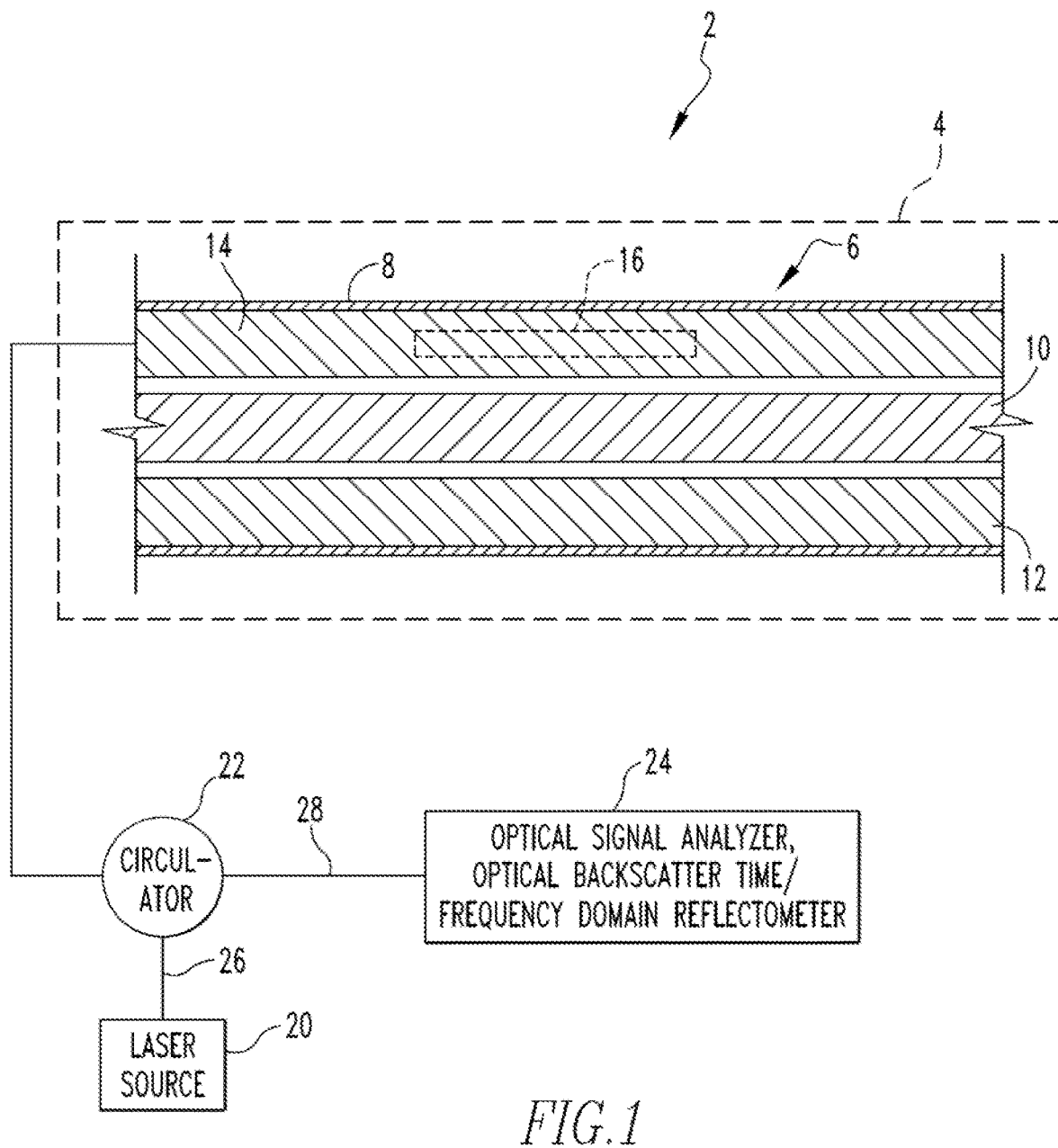
FIG. 1 is a schematic diagram of a sensing system according to an exemplary embodiment of the disclosed concept.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, the word "unitary" means a component is created as a single piece or unit. That is, a component that includes pieces that are created separately and then coupled together as a unit is not a "unitary" component or body.

As used herein, the statement that two or more parts or components "engage" one another shall mean that the parts exert a force against one another either directly or through one or more intermediate parts or components.

As used herein, the term "number" shall mean one or an integer greater than one (i.e., a plurality).

As used herein, the term "functionalized optical fiber based sensor device" shall mean a device that includes an optical fiber having one or more sensor elements (including transient sensor elements) such that the functionalized optical fiber based sensor device exhibits a change or changes in optical properties (such as transmitted spectrum, intensity, or polarization, without limitation) in response to changes in environmental parameters in the environment around the in-fiber sensor element(s) (such as, without limitation, radiation, chemical composition, strain and/or temperature).

As used herein, the term "high-temperature" shall mean temperature of approximately 400° C. and higher.

As used herein, the term "high-temperature stable fiber Bragg grating" shall mean a fiber Bragg grating capable of maintaining its reflective properties at high-temperatures for long periods of time (e.g., weeks, months or years of continuous operation) without significant degradation of those properties.

As used herein, the terms "scattering based system" and "scattering based interrogation approach" shall mean a system or interrogation method in which the basis of measurement is the collection of light scattered by materials present in the fiber sensor or the environment, respectively.

As used herein, the term "back scattering based interrogation" shall mean sensor interrogation utilizing scattering emerging from the same end of the sensing fiber as the interrogation source.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject invention. It will be evident, however, that the disclosed concept can be practiced without these specific details without departing from the spirit and scope of this innovation.

The disclosed concept, in one embodiment, uses electrical cables, which are ubiquitously deployed in industrial, commercial, and residential buildings, as sensor platforms. Specialty optical fibers are seamlessly integrated into electrical cables as sensing devices. In one aspect, the disclosed concept uses distributed fiber-sensing schemes such as, but not limited to, Rayleigh backscattering optical frequency domain reflectometry (R-OFDR), Brillouin backscattering optical time domain reflectometry (BOTDR), Raman backscattering, and fiber Bragg grating array (FBG) sensing, to detect both physical parameters (e.g., radiation, temperature, strain, pressure, liquid levels) and chemical information (e.g., radical chemical species (such as hydrogen) concentrations) with high spatial resolutions (1 mm to 1 meter). Alternatively, as described herein, the disclosed concept may also use single point sensing to sense such parameters.

Since electrical cables are already part of industrial (e.g., nuclear power), commercial, and residential structures (e.g., buildings), no alteration or modification of such structures is needed to accommodate new sensors. This will greatly reduce costs and engineering barriers for sensor deployments. The disclosed concept thus provides a feasible and cost-efficient solution for building smart infrastructures and cyber physical systems. The disclosed concept allows for: (i) seamless integration of optical fiber with electric cables as sensors, (ii) a distributed fiber optical sensing scheme for measurement across large distance with spans from 100 meters to up to 100 km with high spatial resolutions, and (iii) fiber ffinctionalization for multi-parameter measurements for temperature, strain, pressure, radiation, flow, chemical species, etc.

As noted above, the disclosed concept may employ single point fiber-optic based sensing techniques to sense various parameters. While effective, such schemes are only capable of providing information about the average value of the sensed parameter at the location of the in-fiber sensing element. Thus, according to a further aspect of the disclosed concept, optical fiber sensor technology is integrated with more complex interrogation approaches (as described below) to enable distributed sensing of parameters of interest (such as radiation, chemical composition, temperature or strain distribution) across a location. Multi-point sensing can be done in a variety of ways which may resolve a continuous distribution of the sensed parameter as a function of position through: (i) scattering (e.g., back-scattering) based approaches (for example, known Rayleigh scattering, Brillouin scattering, or Raman scattering approaches), or (ii) a discrete set of sampling points through the use of multiple sensor elements provided in an array, such as fiber Bragg gratings inscribed in the sensor core along with a functionalized overcoating. An example of such a back-scattering approach is described in R. G. Duncan, B. J. Soller, D. K. Gifford, S. T. Kreger, R. J. Seeley, A. K. Sang, M. S. Wolfe, and M. E. Froggatt, "OFDR-Based Distributed Sensing and Fault Detection for Single- and Multi-Mode Avionics Fiber-Optics", available at http://lunainc.com/wp-content/uploads/2012/08/OFDR-Based-Distributed-Sensing.pdf Examples of the use of multiple sensor elements are described in L. C. G. Valente et al., "Time and Wavelength Multiplexing of Fiber Bragg Grating Sensors Using a Commercial OTDR", Optical Fiber Sensors Conference Technical Digest, May 10, 2002, Portland, Oreg.

Unlike localized fiber optic sensors such as fiber Bragg gratings, non-localized distributed sensors offer the unique characteristic of being able to use the entire length of an un-modified optical fiber as a sensor, allowing the measurements of thousands of points along the fiber. The most developed technologies of distributed fiber optic sensors, which have sufficient spatial resolutions and can perform both strain and temperature measurements, are based on Brillouin scattering and Rayleigh scattering.

In Brillouin scattering, as a nonlinear interaction between the light and the silica material, if an intense optical pulse is launched into a fiber, it will generate lattice vibration with characteristic frequency $\Omega B$ in the form of pressure wave (i.e., a phonon), which periodically modulates density of the fiber. This wave can be treated as transient gratings in the fiber traveling at speed of the sounds bra associated with the acoustic wave frequency $\Omega B$. When these moving transient gratings diffract the probing light, the frequency of the probing light will experience a Doppler frequency shift of $\pm \Omega B$, depending on relative directions between the sound wave and probing light. Since the acoustic frequency $\Omega B$ depends on the temperature or strain in optical fibers, the measurement of $\Omega B$ as the function of travel time t of optical pulse provides spatially resolved strain or temperature measurement. From this basic principle, the spatial resolution of the Brillouin scattering depends on the pump pulse width. An optical time domain reflectometry technique (OTDR) is usually employed, in which the system is probed by fast laser pulses and the spatial resolution is limited by the pulse duration. Typically, optical pulses at 1 GHz are used, which lead to typical spatial resolution of OTDR around ~30 cm to 1 meter. The Brillouin technique can achieve >50 km level distributed measurement with 1-m level spatial resolution.

Rayleigh scattering is an elastic scattering of light by subwavelength-size particles during light propagation. In optical fibers, the density fluctuations of silica material give rise to the Rayleigh scattering loss. The scattering coefficient in optical fiber can be estimated as:

$$\alpha(z)_{Rayleigh} = \frac{8\pi}{3\lambda^4}[n(z)^8 p^2](kT_f)\beta,$$

where n(z) is the refractive index profile, p is the photo-elastic coefficient, k is the Boltzmann constant, $\beta$ is the isothermal compressibility, and Tf is the fictive temperature at which the density fluctuations are frozen. Rayleigh back-scatter in an optical fiber is caused by random fluctuations in the index profile n(z) along the fiber length, which can be modeled as a very weak and long FBG with random period.

When external stimulus (T, strain) changes the local index, it changes the local reflection spectrum, which can be used as a sensing signal measured by an Optical Frequency Domain Reflectometry (OFDR) technique.

A primary challenge of distributed sensing approaches employing multiple sensor elements, such as fiber Bragg gratings, provided in an array in high temperature environments, such as a nuclear reactor, is the stability of fiber Bragg gratings in fabricated devices. Recent developments in generating high temperature stable fiber gratings can potentially help to overcome this latter technological challenge, and, according to an aspect of the disclosed concept, may be used in connection with the various embodiments described herein. Example of such a high temperature stable fiber gratings are described in United States Patent Application Publication Number 2014/0321798, entitled "Optical Sensor Employing a Refractive Index Engineered Metal Oxide Material", the disclosure of which is incorporated herein by reference, and in Zsolt L. Poole, Paul Ohodnicki, Michael Buric, Aidong Yan, Shaymaa Riyadh, Yuankun Lin, and Kevin P. Chen, "Block Copolymer Assisted Refractive Index Engineering Of Metal Oxides For Applications In Optical Sensing," Proc. SPIE 9161, Nanophotonic Materials X I, 91610P (Sep. 10, 2014), and T. Chen, R. Chen, C. Jewart, B. Zhang, K. Cook, J. Canning, and K. P. Chen, "Regenerated Gratings in Air-Hole Microstructured Fibers for High-Temperature Pressure Sensing", Optics Letters 36 (18), 3542-4 (2011), and Y. K. Cheong, W. Y. Chong, S. S. Chong, K. S. Lim, and H. Ahmad, "Regenerated Type-IIa Fibre Bragg Grating from a Ge—B Codoped Fiber via Thermal Activation", Optics & Laser Technology 62, 69-72 (2014).

FIG. 1 is a schematic diagram of a sensing system 2 that may be implemented in conjunction with a structure 4 of an industrial, commercial or residential building, such as, without limitation, a nuclear reactor vessel. In the exemplary embodiment, structure 4 is a nuclear reactor vessel. Sensing system 2 is structured to enable continuous distributed sensing of one or more parameters within structure 4, such as a physical parameter (e.g., radiation, temperature, strain, pressure, liquid levels) or a chemical parameter (e.g., radical chemical species (such as hydrogen) concentration). In the illustrated embodiment, sensing system 2 includes a cable device 6 described in greater detail below. Sensing system 2 also includes a laser source 20, a circulator 22, an optical signal analyzer, optical backscatter time/frequency domain reflectometer 24, and transmission fibers 26 and 28.

Cable device 6 is implemented in accordance with the disclosed concept. Cable device 6 includes a sheath member 8 that may be, for example and without limitation, a flexible polyvinylchloride (PVC) conduit or tube. Cable device 6 also includes first and second electrical cables 10 and 12, which are provided within sheath member 8. In the exemplary embodiment, each electrical cable 10, 12 is structured to be functional within a harsh environment such as a nuclear reactor vessel, and is resistant to and can tolerate radiation up to 100 kGy (10 MRad). [32] As seen in FIG. 1, cable device 6 also includes an optical fiber sensing member 14. Optical fiber sensing member 14 is a functionalized optical fiber based sensor device that includes an in-fiber sensing element 16. Optical fiber sensing member 14 is structured to enable continuous distributed sensing of one or more parameters within structure 4 as described above using a back-scattering based interrogation approach, for example as described herein. In the exemplary embodiment, in-fiber sensing element 16 is a monolithic in-fiber sensing element. In alternative embodiments, in-fiber sensing element 16 is an array of discrete sensor elements, such as an array of high temperature stable Fiber-Bragg grating sensor elements.

In operation, in-fiber sensing element 16 exhibits a change in optical absorption in the presence of a particular parameter of interest, e.g., radiation, temperature, strain, or hydrogen concentration. The change in optical absorption is correlated with the parameter of interest in well-designed sensor elements, which results in optical transmission over a range of wavelengths which is correlated to the parameter of interest. Consequently, the backscattering which is intrinsic to all optical materials (including in-fiber sensing element 16) is also correlated in intensity to the parameter of interest. When interrogated with an optical backscattering based distributed interrogator, such as optical signal analyzer, optical backscatter time/frequency domain reflectometer 24, the parameter of interest may further be correlated with physical distance or position along optical fiber sensing member 14. In combination with appropriate calibration techniques, the approach described can allow for quantification of the absolute magnitude and/or gradient in the parameter of interest.

In one non-limiting example, optical fiber sensing member 14 is sensitive to and able to sense gamma radiation (e.g., from 1 Gy to >10,000 Gy), and thus the parameter of interest is radiation level or absorption. Such an exemplary optical fiber sensing member 14 could be, without limitation, an optical fiber doped with aluminum.

In another non-limiting example, optical fiber sensing member 14 is radiation resistant and is structured to measure a physical parameter such as strain or temperature. Such an exemplary optical fiber sensing member 14 could be, without limitation, an air-hole photonic crystal fiber, a pure silica core fiber, or an F-doped fiber.

In still another non-limiting example, optical fiber sensing member 14 is radiation resistant and sensitive to chemical species. As such, optical fiber sensing member 14 is structured to enable measurement of a chemical parameter such as radical chemical species (e.g., hydrogen) concentration. Such an exemplary optical fiber sensing member 14 could be, without limitation, a radiation-resistant fiber with a chemical reactive fiber coating, a D-shaped optical fiber wherein the fiber core is exposed to ambient atmosphere, or an optical fiber with diffusive (e.g., random air-hole) cladding that is structured to allow chemical species to be permeated therethrough to interact with the fiber core.

In the exemplary embodiment, optical fiber sensing member 14 is protected by an appropriate polymer tube to reduce friction with electrical cables 10, 12.

Figure 2:
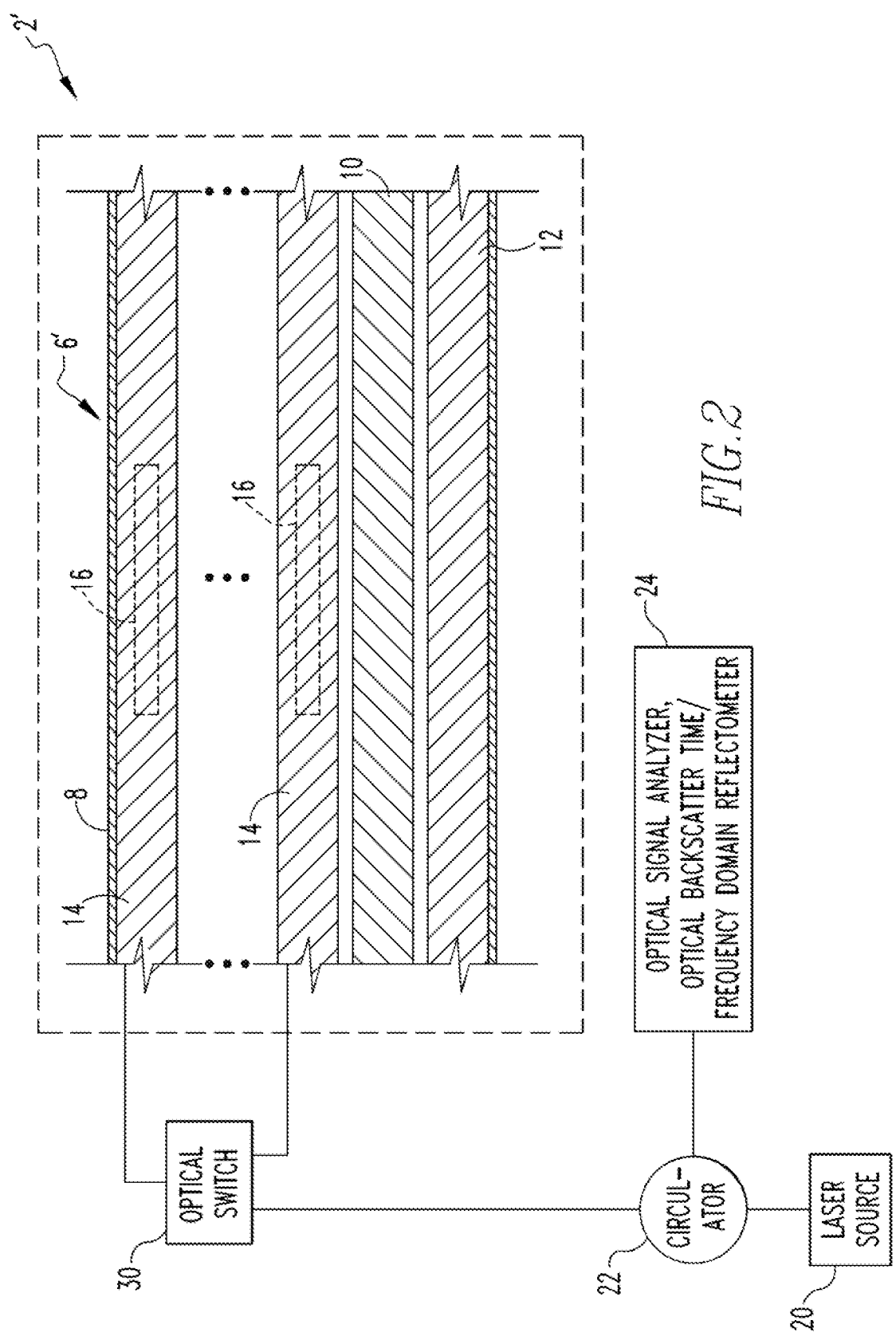
FIG. 2 is a schematic diagram of a sensing system according to an alternative exemplary embodiment of the disclosed concept.

FIG. 2 is a schematic diagram of a sensing system 2' that may be implemented in conjunction with structure 4 according to an alternative embodiment. Sensing system 2' is similar to sensing system 2 (like components are labelled with like reference numerals), and is structured to enable continuous distributed sensing of multiple parameters within structure 4. In the illustrated embodiment, sensing system 2' includes an alternative cable device 6' that is similar to cable device 6, except that it includes a plurality of optical fiber sensing members 14 structured to measure different parameters. An optical switch 30 is provided to enable selection from among the plurality of measured parameters.

Figure 3:
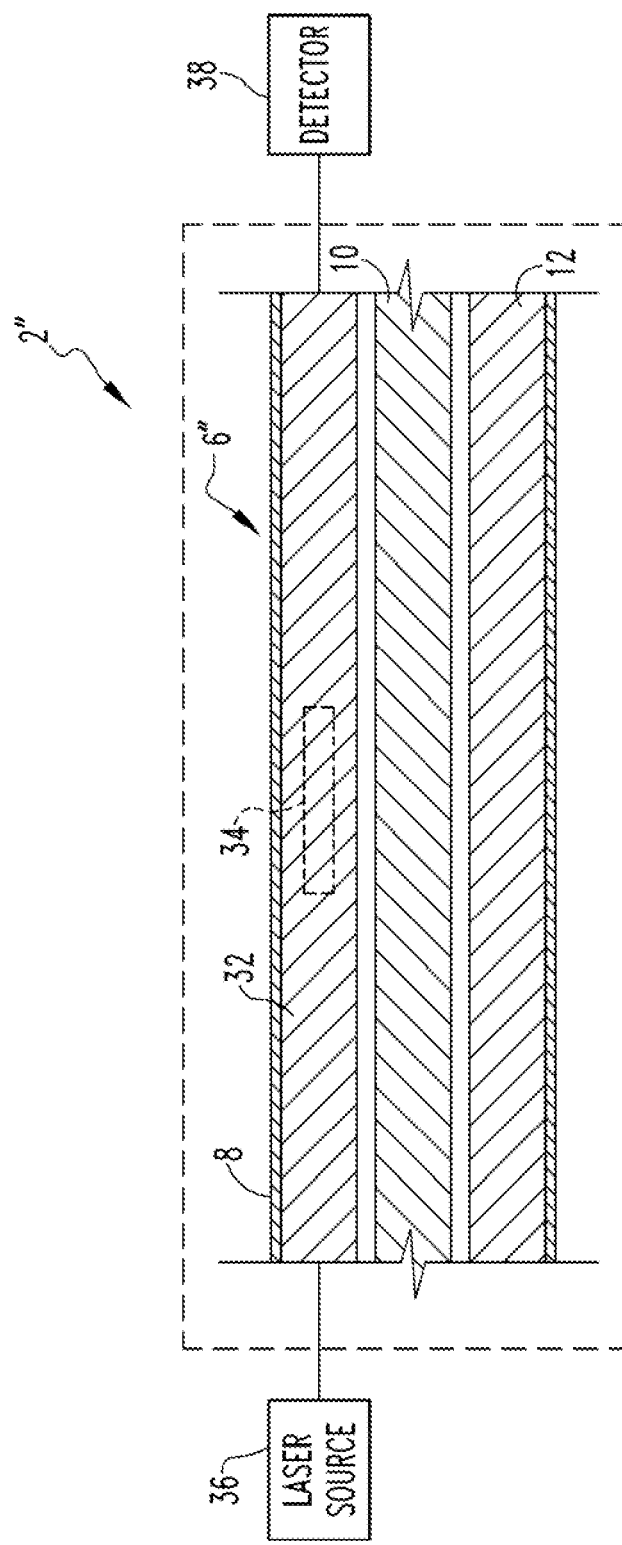
FIG. 3 is a schematic diagram of a sensing system according to a further alternative exemplary embodiment of the disclosed concept.

As noted elsewhere herein, the disclosed concept may also use single point sensing to sense such parameters. FIG. 3 is a schematic diagram of a sensing system 2" that may be implemented in conjunction with structure 4 according to another alternative embodiment that employs single point sensing. This embodiment includes an alternative cable device 6" that is similar to cable device 6, except that it includes an alternative optical fiber sensing member 32 that is a functionalized optical fiber based sensor device. Optical fiber sensing member 32, however, includes a single point in-fiber sensing element 34.

Single point in-fiber sensing element 34 may be any of a number of known or hereafter developed in-fiber sensing elements. For example, a suitable in-fiber sensing element 34 may be a silica-based optical fiber with the cladding removed and a SrTiO3 or La-doped SrTiO3 thin film coated on the exposed core as described in U.S. patent application Ser. No. 14/335,149, entitled "Electronically Conductive Perovskite-Based Oxide Nanoparticles and Films for Optical Sensing Applications" and filed Jul. 18, 2014, the disclosure of which is incorporated herein by r2, Nb-doped TiO2, or Pd-doped TiO2 thin film coated optical fiber as described in U.S. Pat. No. 8,638,440, entitled "Plasmonic Transparent Conducting Metal Oxide Nanoparticles and Films for Optical Sensing Applications". Another suitable in-fiber sensing element 34 may be achieved through the incorporation of gold nanoparticles within inert matrix materials of SiO2, Al2O3, and Si3N4 as a thin film coated on an optical fiber as described in U.S. Pat. No. 8,411,275, entitled "Nanocomposite Thin Films for High Temperature Optical Gas Sensing of Hydrogen". The disclosures of these documents are incorporated herein by reference in all cases.

As seen in FIG. 3, sensing system 2″ further includes a light source 36, such as a laser, and a detector 38. In operation, source light is introduced into optical fiber sensing member 32 from light source 36, and, in response thereto, light is transmitted through optical fiber sensing member 32 and received at detector 38. Optical fiber sensing member 32 and in-fiber sensing element 34 are structured such that one or more optical properties thereof will change depending upon the parameter of interest, such as those described elsewhere herein. As a result, one or more properties of the light transmitted through optical fiber sensing member 32 and detected by detector 38 will, as is known in the art, be indicative of the parameter of interest around in-fiber sensing element 34 at any particular time.

In the embodiments described herein, the fibers can be connected with the monitoring device for continuous monitoring, or can be packed inside the sheath member but kept offline (spare fiber) without continuous monitoring to be checked intermittently.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A cable device, comprising:
    a sheath member;
    a number of electrical cables provided within the sheath member; and
    an optical fiber sensing member provided within the sheath member, wherein the optical fiber sensing member comprises a functionalized optical fiber based sensor device that is directly sensitive to radiation and structured to exhibit a change in one or more optical properties in the presence of and directly in response to one or more changes in the radiation.

2. The cable device according to claim 1, wherein the radiation is gamma radiation from 1 Gy to greater than 10,000 Gy.

3. The cable device according to claim 2, wherein the optical fiber sensing member comprises an optical fiber doped with aluminum.

4. The cable device according to claim 1, wherein the optical fiber sensing member is surrounded by a polymer to reduce friction with the number of electrical cables.

5. The cable device according to claim 1, further comprising a second optical fiber sensing member provided within the sheath member, wherein the second optical fiber sensing member comprises a functionalized optical fiber based sensor device structured to exhibit a change in one or more second optical properties in response to changes in a second parameter of interest that is different than radiation.

6. A sensing system employing the cable device according to claim 1, wherein the optical fiber sensing member includes a single point in-fiber sensing element, and wherein the sensing system is structured to measure the one or more changes in the radiation at a particular location along the cable device.

7. A sensing system employing the cable device according to claim 1, wherein the sensing system is structured to implement distributed sensing of the one or more changes in the radiation along the cable device.

8. The sensing system according to claim 7, wherein the optical fiber sensing member includes a monolithic in-fiber sensing element and wherein the sensing system is structured to implement the distributed sensing using a scattering based interrogation approach.

9. The sensing system according to claim 8, wherein the scattering based interrogation approach is a back scattering based interrogation approach.

10. The sensing system according to claim 7, wherein the optical fiber sensing member includes a plurality of in-fiber sensing elements arranged in series.

11. The sensing system according to claim 10, wherein each of the in-fiber sensing elements includes a high-temperature stable fiber Bragg grating.

12. A sensing method employing the cable device according to claim 1, comprising:
    introducing a source light into the optical fiber sensing member;
    detecting sensing light generated in response to the source light; and
    determining one or more values for the one or more changes in the radiation using the detected sensing light.

13. A method of sensing radiation within a structure, comprising:

introducing a source light into an optical fiber sensing member provided within the structure, wherein the optical fiber sensing member comprises a functionalized optical fiber based sensor device that is directly sensitive to radiation and structured to exhibit a change in one or more more optical properties in the presence of and directly in response to one or more changes in the radiation;

detecting sensing light generated in response to the source light; and determining a radiation level at a plurality of locations within the structure and along the optical fiber sensing member using the detected sensing light and a distributed sensing scheme.

14. The method according to claim 13, wherein the optical fiber sensing member includes a monolithic in-fiber sensing element and wherein the distributed sensing scheme is a scattering based interrogation approach.

15. The method according to claim 14, wherein the scattering based interrogation approach is a back scattering based interrogation approach.

16. The method according to claim 1, Therein the optical fiber sensing member includes a plurality of in-fiber sensing elements arranged in series.

17. The sensing system according to claim 16, wherein each of the in-fiber sensing elements includes a high-temperature stable fiber Bragg grating.

18. The method according to claim 13, wherein the radiation is gamma radiation.

19. The method according to claim 18, wherever the one or more optical properties change responsive to gamma radiation from 1 Gy to greater than 10,000 Gy.

20. The method according to claim 13, wherein the optical fiber sensing member comprises an optical fiber doped with aluminum.

21. A system for sensing radiation in a structure, comprising:
an optical fiber sensing member provided within the structure, wherein the optical fiber sensing member comprises a functionalized optical fiber based sensor device that is directly sensitive to radiation and structured to exhibit a change in one or more optical properties in the presence of and directly in response to one or more changes in the radiation;
a light source structured to introduce a source light into an optical fiber sensing member; and
an optical signal analyzing device structured and configured to detect sensing light generated in response to the source light and determine a radiation level at a plurality of locations within the structure and along the optical fiber sensing member using the detected sensing light and a distributed sensing scheme.

22. The system according to claim 21, wherein the optical fiber sensing member includes a monolithic in-fiber sensing element and wherein the distributed sensing scheme is a scattering based interrogation approach.

23. The system according to claim 22, wherein the scattering based interrogation approach is a back scattering based interrogation approach.

24. The system according to claim 21, wherein the optical fiber sensing member includes a plurality of in-fiber sensing elements arranged in series.

25. The system according to claim 21, wherein the optical fiber sensing member comprises an optical fiber doped with aluminum.

* * * * *